United States Patent [19]
Phillips et al.

[11] Patent Number: 5,966,379
[45] Date of Patent: Oct. 12, 1999

[54] MULTIPLEX EXTENDER FOR DISCRETE I/O DEVICES ON A TIME DIVISION NETWORK

[75] Inventors: Timothy B. Phillips; George E. Burke, Jr., both of Raleigh, N.C.

[73] Assignee: Square D Company, Palatine, Ill.

[21] Appl. No.: 09/024,953

[22] Filed: Feb. 17, 1998

[51] Int. Cl.[6] ....................................................... H04J 3/02
[52] U.S. Cl. .......................... 370/359; 370/360; 370/379; 370/423; 370/463; 710/129
[58] Field of Search .................................... 370/293, 357, 370/359, 360, 362, 363, 378, 379, 423, 438, 463, 465; 710/101, 126, 129, 131

[56] References Cited

U.S. PATENT DOCUMENTS

| | | | |
|---|---|---|---|
| 4,470,139 | 9/1984 | Munter | 370/363 |
| 4,627,050 | 12/1986 | Johnson et al. | 370/363 |
| 4,918,597 | 4/1990 | Krishnan et al. | 710/129 |
| 5,181,201 | 1/1993 | Schauss et al. | 370/359 |

*Primary Examiner*—Alpus H. Hsu
*Attorney, Agent, or Firm*—David R. Stacey; Larry T. Shrout; Larry I. Golden

[57] ABSTRACT

A multiplex extender 26 for permitting discrete I/O devices 34, not individually equipped to decode multiplex channel addresses, to be multiplexed on a time division multiplexed control bus 10. The multiplex extender 26 is connected intermediate the time division multiplexed control bus 10 and a branch line 30 and includes a multiplex channel address decoder 78, a data disconnect switch 82 and a branch line controller 90. The multiplex channel address decoder 78 is selectively programmed to one of the multiplex channel addresses of the time division multiplexed control bus 10. The multiplex channel address decoder 78 produces one or more output signals, each being determined by the multiplex channel address which has most recently been decoded. The data disconnect switch 82, connected in series with a data line of the time division multiplexed control bus 10 and a data line of the branch line 30, either passes or blocks the flow of data between the time division multiplexed control bus 10 and the discrete I/O devices 34 in response to the output signal from the multiplex channel decoder 78. A data latch/repeater 86, also connected to the data line of the time division multiplexed control bus 10, selectively stores data from the time division multiplexed control bus 10 or repeats previously stored data to and the discrete I/O devices 34 A branch line controller 90 transmits the previously stored data from the data latch/repeater 86 to the branch line 30 when the data disconnect switch 82 is blocking data frames from the time division multiplexed control bus 10. The multiplex extender 26 can also incorporate a heartbeat pass-through/repeater 94 for passing a heartbeat pulse to the discrete I/O devices 34 during each data frame.

19 Claims, 6 Drawing Sheets

MULTIPLEX EXTENDER FOR DISCRETE I/O DEVICES ON A TIME DIVISION NETWORK

FIELD OF THE INVENTION

The present invention relates to the field of time division multiplexed control buses and in particularly to a device for permitting discrete I/O devices without multiplex channel address decoders to be used on a time division multiplexed control bus.

BACKGROUND OF THE INVENTION

It is known to use time division multiplexing on a control bus or network to increase the number of control devices which may be attached to that bus. Multiplexing increases the given number of unique I/O addresses (time slots) of the control bus by adding one or more multiplexed channels, each channel having a unique address and a number of I/O addresses. The I/O addresses of each multiplex channel are the same. Data is sent over the control bus in frames, each of which includes a particular one of the multiplex channel addresses followed by data for each of the I/O devices on that particular multiplex channel. The unique multiplex channel address ensures that only one multiplex channel can be accessed by the bus controller at a time. Since the I/O addresses on each multiplex channel are the same, each I/O device must have a decoding circuit which can decode both the multiplex channel addresses and the I/O address. This prevents an I/O device on one multiplex channel from receiving data directed to an I/O device on another multiplex channel. Output devices have an additional multiplexing problem since they require a refresh signal during each data frame. Since each data frame is addressed to a different multiplex channel address, the output devices connected to one multiplex channel will not receive their next refresh signal until all of the other multiplex channels on the control bus have received one data frame. Therefore, some means must be provided for each output device to receive a refresh signal during each data frame, regardless of the multiplex channel to which it is addressed. The extra circuitry required for decoding multiplex channel addresses and accessing refresh signals increases the cost and circuit board space requirements for each I/O device. These cost and space increases may not be as significant in the larger and more expensive analog device modules, but it can be significant in the smaller and less expensive discrete I/O device modules. Therefore, it would be desirable to have a device which could extend multiplexing capabilities to a number of down line modules, either analog or discrete I/O devices, without requiring that each module have its own multiplex channel decoder and refresh circuitry. Niobrara R&D Corporation of Joplin, Miss., has developed a device which permits the installation of discrete input devices on a time division multiplexed control bus. However, their device will not permit discrete output devices to be installed on a time division multiplexed control bus. Some control bus systems also require a "heartbeat" pulse to indicate whether or not a bus fault has occurred or whether the main (up-line) data line has failed to change states from HIGH to LOW or LOW to HIGH in the last data frame. The heartbeat pulse must be received by each I/O device during each data frame, regardless of the multiplex channel to which the frame is addressed. It is therefore required that the multiplex extending device also include circuitry for passing the heartbeat pulse to all I/O device on the control bus during each data frame. A heartbeat type control bus system is described in U.S. Pat. Nos. 4,808,994; 5,553,070 and 5,631,854 issued to Riley and U.S. Pat. No. 5,555,267 issued to Burke Jr., et al. all of which are incorporated herein by reference.

SUMMARY OF THE INVENTION

The present invention provides a multiplex extender which is connected between the time division multiplexed control bus and a branch line on which a number of discrete or analog I/O devices to be multiplexed are connected. The multiplex extender is selectively programmable by the user to any one of the multiplex channel addresses available on the time division multiplexed control bus. The multiplex extender operates by allowing the branch line I/O devices to have access to the time division multiplexed control bus only when the multiplexed channel address to which the extender has been programmed is polled by the bus controller. When any other multiplex channel address is polled by the bus controller, access to the branch line I/O devices will be blocked by the multiplex extender. The extender provides circuitry for refreshing each branch line output device during each frame. The extender also provides a simple and inexpensive circuit for passing or repeating a "heartbeat" pulse to all I/O devices on the branch line during each data frame. The functions described above are performed by a multiplex channel address decoder circuit, a data disconnect switch and a data latch/repeater circuit controlled by the multiplex decoder circuit, a heartbeat pass-through/repeater circuit and a data driver or transmitter which transmits data to the branch line I/O devices in response to output signals from the data latch/repeater and/or the heartbeat pass-through/repeater.

Figure 1:
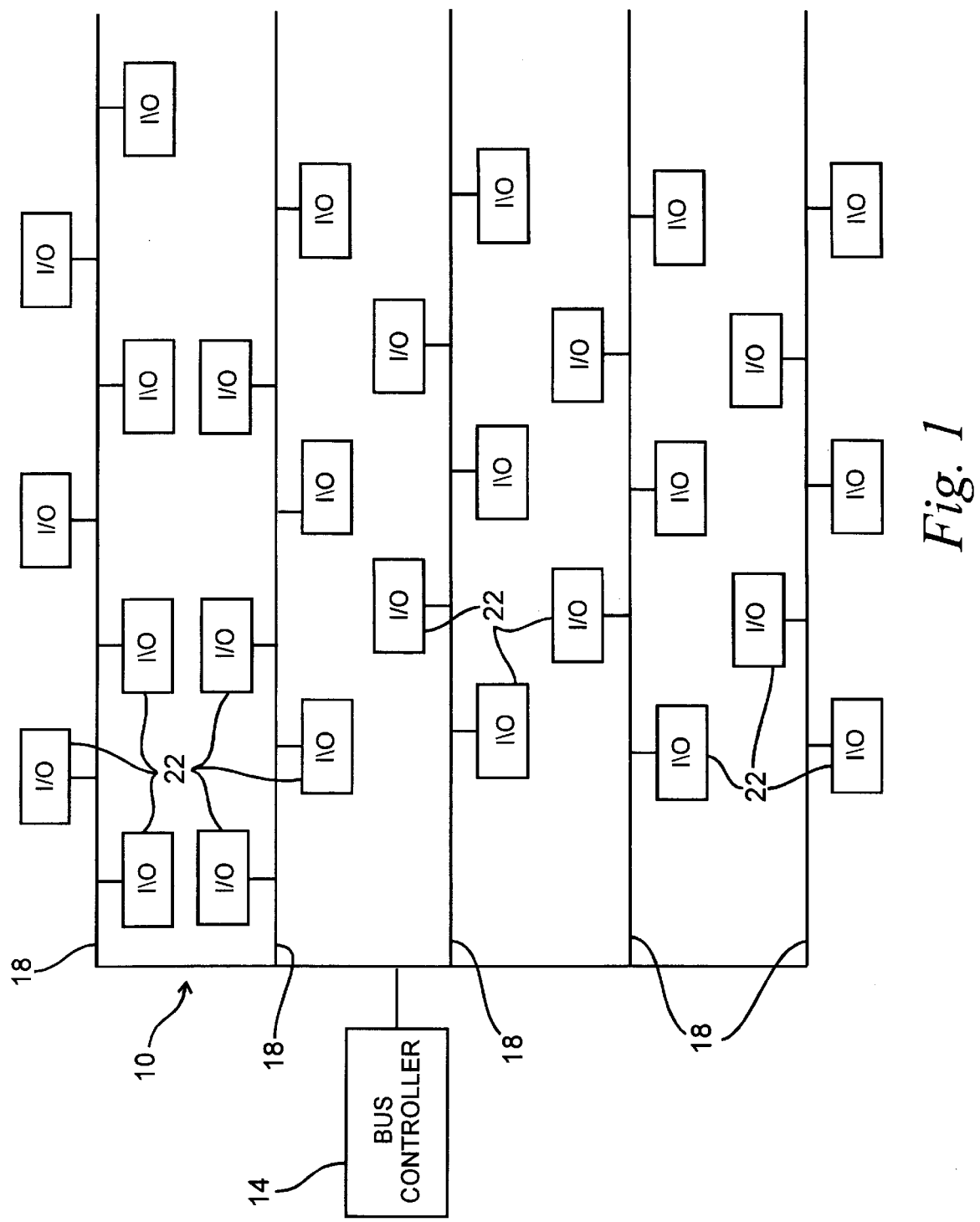
FIG. 1 is a block diagram of a time division multiplexed control circuit using I/O devices with multiplex channel address decoder circuits.

Before one embodiment of the invention is explained in detail, it is to be understood that the invention is not limited in its application to the details of construction and description or as illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates, in block diagram form, a time division multiplexed control bus, generally indicated by reference numeral 10. The control bus 10 includes a bus controller 14 and one or more bus lines 18, each having separate conductors for clock, data, and positive and negative power. A shield conductor is optional. The bus controller 14 defines a particular number of individual I/O addresses to which data can be directed. In most control bus applications, each individual I/O address is assigned to one I/O device 22. Therefore, the number of I/O devices 22 which can be connected to the control bus 10 is limited to the number of individual I/O addresses defined by the bus controller 14. In order to expand the number of I/O devices 22 which can operate on the control bus 10, the bus controller 14 can also define a number of time division multiplexed channels wherein each channel has the same particular number of individual I/O addresses. However, since the bus controller 14 has only defined a particular number of individual I/O addresses, each multiplexed channel must use the same I/O addresses. To prevent an I/O device 22 on one multiplexed channel from receiving data directed to an I/O device 22 having the same I/O address but on a different multiplexed channel, each multiplexed channel has a unique multiplex channel address. Therefore, each I/O device 22 operating on the time division multiplexed control bus 10 must have circuitry for decoding not only its individual I/O address, but it must also have circuitry for decoding the unique multiplex channel address of the multiplex channel on which it is operating.

Figure 2:
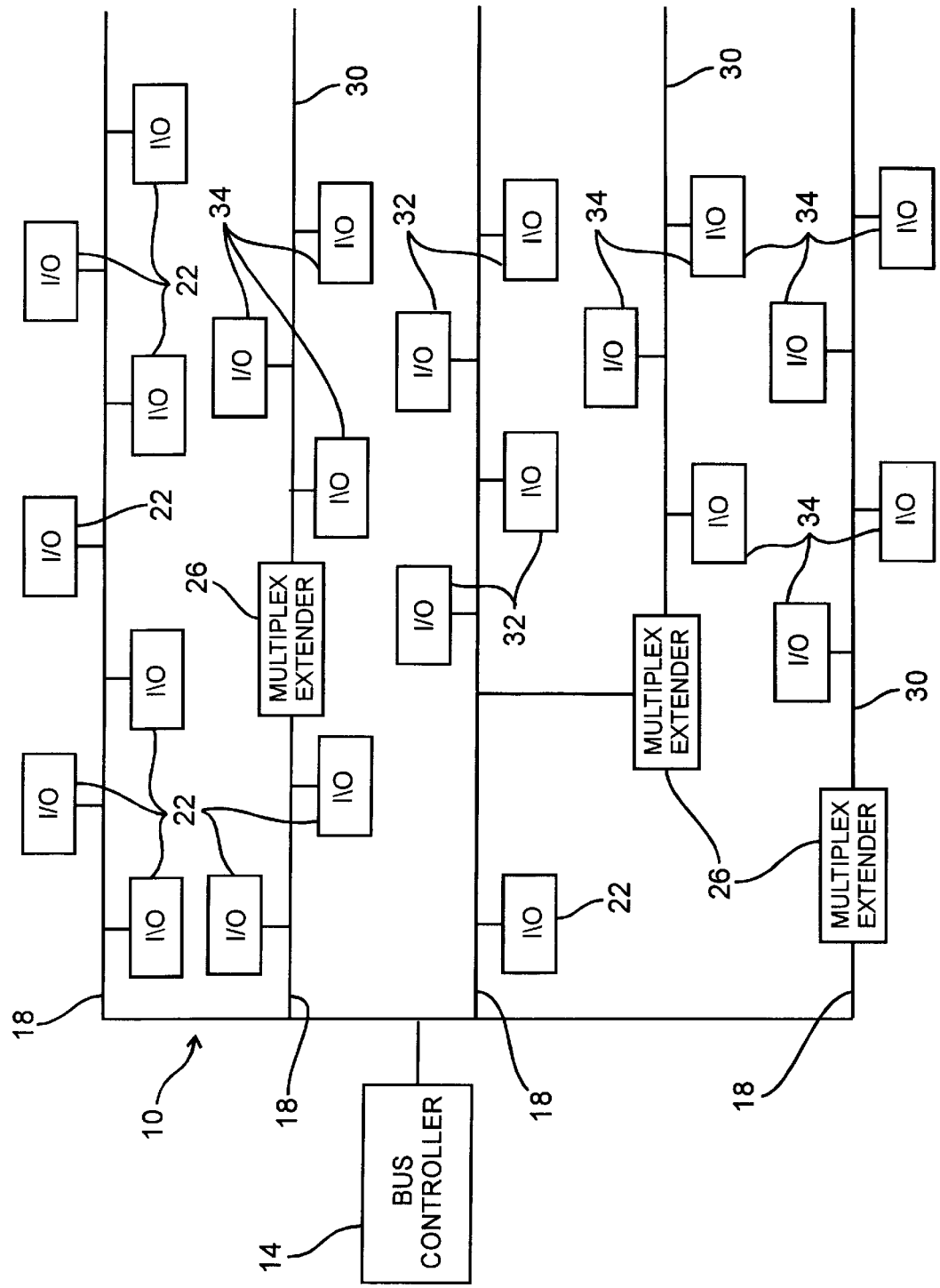
FIG. 2 is a block diagram of a time division multiplexed control circuit using multiplex extenders and I/O devices with and without multiplex channel address decoder circuits in accordance with the present invention.

FIG. 2 illustrates, in block diagram form, a time division multiplexed control bus 10 incorporating multiplex extenders 26 in accordance with the present invention. Each multiplex extender 26 is connected between one of the data lines 18 and a branch line 30, which also has separate conductors for clock, data, positive and negative power, and optional shield. The multiplex extenders 26 permit less expensive discrete I/O devices 34 to be used on the time division multiplexed control bus 10. These discrete I/O devices 34 do not have the additional circuitry required to decode multiplexed channel addresses. Multiplex extenders 26 are connected to the bus lines 18 in the same manner as the I/O devices 22, such that data, clock and power signals from the bus controller 14 must pass through the multiplex extenders 26 to the branch lines 30 on which the discrete I/O devices 34 are connected. The number of discrete I/O devices 34 connected to each multiplex extender 26 can be equal to the number of individual I/O device addresses defined by the bus controller 14. A multiplex extender 26 and its discrete I/O devices 34 can be used in combination with one or more I/O devices 22, each having an internal multiplex channel decoder, to use all of the I/O addresses available on one multiplexed channel.

Figure 3:
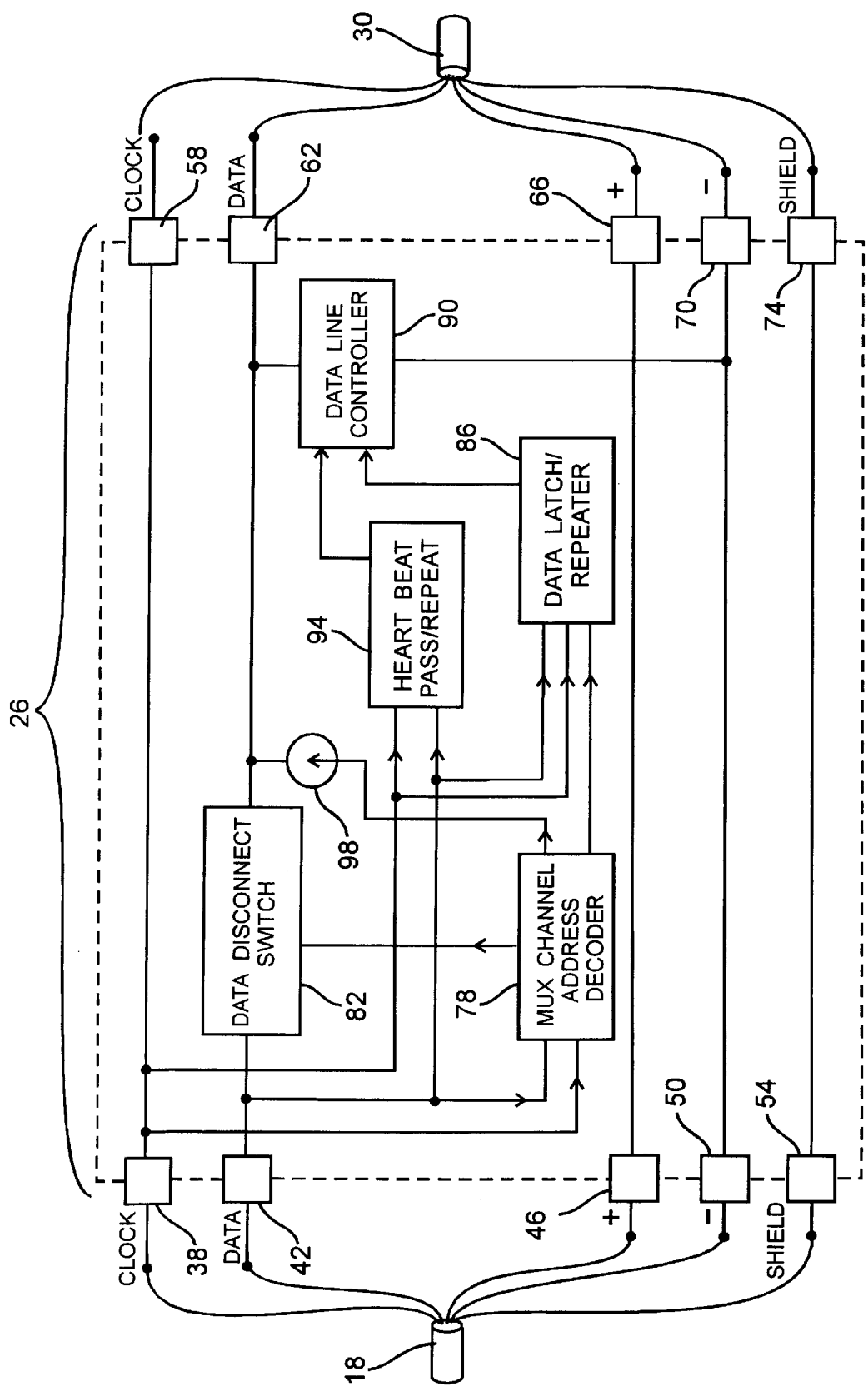
FIG. 3 is a block diagram of a multiplex extender in accordance with the present invention.

FIG. 3 is a block diagram illustrating the main sections of the multiplex extender 26 and their interconnections. Each multiplex extender 26 includes a clock line input terminal 38, a data line input terminal 42, a positive power input terminal 46, a negative power input terminal 50 and an optional shield input terminal 54 for connecting to the bus line 18 of the time division multiplexed control bus 10, and a clock line output terminal 58, a data line output terminal 62, a positive power output terminal 66, a negative power output terminal 70 and an optional shield output terminal 74 for connecting to the branch line 30 and its discrete I/O devices 34. The clock line, positive power, negative power and shield input terminals 38, 46, 50 and 54, respectively, are directly connected to their corresponding clock line, positive power, negative power and shield output terminals, 58, 66, 70 and 74, respectively, such that the clock pulses and power can be passed directly through the multiplex extender 26 to the branch line 30 and its discrete I/O devices 34. The input and output terminals can be either individual terminals or multi-pin connectors. Inside the multiplex extender 26 are a multiplex channel address decoder 78, a data disconnect switch 82, a data latch/repeater 86, a branch line controller 90, and a heartbeat pass-through/repeater 94, which is optional depending on the control bus system. The multiplex channel address decoder 78 is user programmable to any one of the multiplex channel addresses available on the time division multiplexed control bus 10. In its simplest form, the multiplex channel address decoder 78 uses shift registers and simple logic functions to compare the multiplex channel address code of each data frame with the settings of a number of dip switches selectively positioned to indicate the programmed multiplex channel address code. In more sophisticated applications a microprocessor in the multiplex channel address decoder 78 will evaluate the multiplex channel address of each data frame and compare it with the multiplex channel address code previously programmed into an EEPROM or similar device. A multiplex channel address decoder 78 is described in Riley U.S. Pat. No. 5,555,267. The multiplex channel address decoder 78 has inputs from the clock line input terminal 38 and the data line input terminal 42 and outputs which connect to the data disconnect switch 82 and data latch/repeater 86. The output signals from the multiplex channel address decoder 78 to the data disconnect switch 82 and data latch/repeater 86 will either indicate that the programmed multiplex channel address has been decoded TRUE or that any of the other multiplex channel addresses have been decoded FALSE. The multiplex channel address decoder 78 also has a third output which provides a current signal 98 to the data line output terminal 62 This current signal 98 is provided only in conjunction with a FALSE output signal from the multiplex channel address decoder 78. The current signal 98 charges the data line of the branch line 30 to a particular level equivalent to an idle state level of the time division multiplexed control bus 10 when no data is being transmitted. In the preferred embodiment, the idle state of both the time division multiplexed control bus 10 and the branch line 30 is a HIGH state. However, in other embodiments the idle state of the control bus data line and the branch line data line could be indicated by either a HIGH or a LOW state. The current signal 98, in combination with the branch line controller 90, form a data driver or data transmitter which transmits selected data to the branch line 30 when the data disconnect switch 82 is in an open state. The branch line controller 90 actively pulls the data line of the branch line 30 to the opposite of its normal HIGH or LOW idle state for periods of time determined by inputs to the branch line controller 90, thereby causing data to be transmitted to the branch line 30. Other known data drivers could be used to perform the same function. The data disconnect switch 82 also has an input from the data line input terminal 42 and an output which is connected to a data line output terminal 62. The open or closed state of the data disconnect switch 82 is controlled by the input from the multiplex channel address decoder 78. The data latch/repeater 86 also has inputs from the clock line input terminal 38 and the data line input terminal 42 and an output connected to the branch line controller 90, which, in this embodiment, is a normally open control switch 118 (FIG. 5) electrically connected between the data output terminal 62 and the negative power line. The control switch 118 of the branch line controller 90 is selectively closed and opened electrically by the output signal from the data latch/repeater 86. The latching (storing) or repeating of data by the data latch/repeater 86 is controlled by the input from the multiplex channel address decoder 78. The heartbeat pass-through/repeater 94, when required, has inputs from the clock line input terminal 38 and the data line input terminal 42 and an output connected to the branch line controller 90. When a "heartbeat" pulse is required by the discrete I/O devices 34, the pulse will be passed or repeated by the heartbeat pass-through/repeater 94. The heartbeat passthrough/repeater 94 can also use the branch line controller 90 to pass or repeat the heartbeat pulse.

During normal operation, the multiplex channel address decoder 78 of each multiplex extender 26 will read and decode the multiplex channel address located at the beginning of each data frame to determine if the multiplex channel address being polled by the bus controller 14 is its programmed multiplex channel address. When the multiplex channel address decoder 78 determines that the multiplex channel address being polled is its programmed address, it will send a signal to the data disconnect switch 82 causing that switch to close and thereby permit the data in that data frame to be passed directly from the data input terminal 42 to the data output terminal 62 and ultimately to the discrete I/O devices 34 connected on the branch line 30 of that particular multiplex extender 26. At the same time, the multiplex channel address decoder 78 sends a signal to the data latch/repeater 84 causing it to latch or store the data of the particular data frame in a volatile memory means, such as RAM, for future use. The discrete I/O devices 34 will each read the data addressed to them in the particular data frame and respond accordingly. The responses of each discrete I/O device 34 will be sent back up the branch line 30 to the data output terminal 62, through the closed data disconnect switch 82 to the data input terminal 42, and then to the bus controller 14 or other addressed I/O devices on the control bus 10. When the multiplex channel address decoder 78 determines that the multiplex channel address being polled by the bus controller 14 is not its programmed address, it will send a signal to the data disconnect switch 82 causing the switch to open and thereby prohibit data in that data frame from being passed to the data output terminal 62. Simultaneously, the multiplex channel address decoder 78 will send a current signal 98 of a particular value from its third output to the data output terminal 62, thereby actively pulling the data line of its associated branch line 30 HIGH for as long as the data disconnect switch 82 is open. The multiplex channel address decoder 78 will also send a signal to the data latch/repeater 86 causing it to repeat the data previously stored during the last data frame addressed to the programmed multiplex channel address of that particular multiplex extender 26. The data latch/repeater 86 repeats its previously stored data by accessing the branch line controller 90. The output signals from the data latch/repeater 86 cause the control switch 118 of the branch line controller 90 to close and open, which in turn causes the branch line 30 to be pulled LOW for a period equal to the time the control switch 118 is closed. Any responses from the discrete I/O devices 34 to the repeated data from the data latch/repeater 86 will not be passed through the open data disconnect switch 82 to the control bus 10. The multiplex extender 26 will continue to block all incoming data frames and repeat the previously stored data until the next data frame addressed to its programmed multiplex channel address is received from the network controller 14 and decoded by the multiplex channel address decoder 78. At that time, the data disconnect switch 82 will again be closed, allowing the new data to pass through to the discrete I/O devices 34 and the data latch/repeater 84 will replace the previously stored data with the new data being received.

In some control buses 10 a "heartbeat" pulse is sent during each data frame as a data line test. Each I/O device, 22 or 34, must receive that "heartbeat" pulse or revert to a predetermined state, usually "OFF". In these applications the heartbeat pass-through/repeater 94 will receive the heartbeat pulse from the data line input terminal 42 during each data frame, regardless of the multiplex channel address, and pass only the heartbeat pulse to the branch line controller 90, which in turn passes the heartbeat pulse to the data output terminal 62 such that it can be received by the discrete I/O devices 34.

Figure 4:
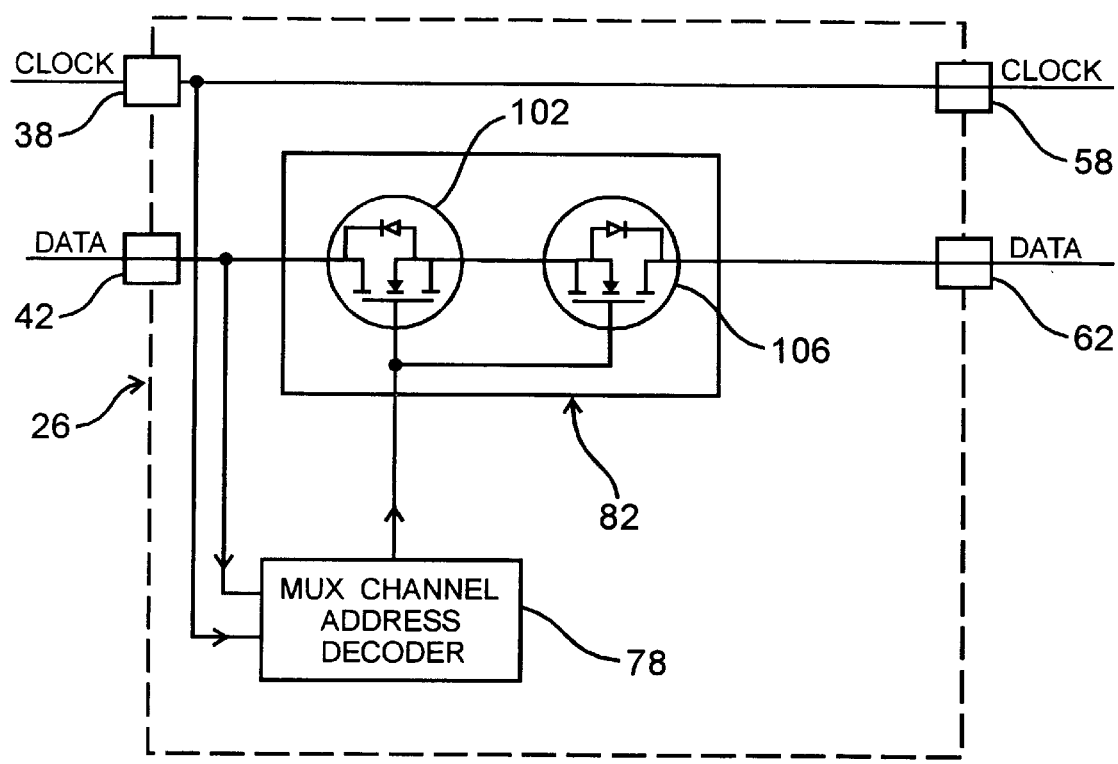
FIG. 4 is a circuit diagram of one embodiment of a data disconnect switch of a multiplex extender in accordance with the present invention.

FIG. 4 illustrates one embodiment of the data disconnect switch 82 which is a simple bi-directional analog switch. In this embodiment the data disconnect switch 82 includes a first FET 102 electrically connected in series with a second FET 106 such that the sources of the two FETs, 102 and 106, are connected together and the drain of the first FET 102 is connected to the data input terminal 42 while the drain of the second FET 106 is connected to the data output terminal 62. The gates of the two FETs 102 and 106 are electrically connected together such that a signal from the multiplex channel address decoder 78 controls both FET 102 and FET 106. When the multiplex channel address decoder 78 decodes its programmed multiplex channel address in a data frame, it sends a signal which gates the FETs 102 and 106 "ON". This permits data received at the data line input terminal 42 to pass through FETs 102 and 106 to the data output terminal 62, down the branch line 30 to the discrete I/O devices 34. In a similar manner, data returning from the discrete I/O devices 34 up the branch line 30 to the data output terminal 62 will pass through FETs 102 and 106 to the data input terminal 42 and then to the bus controller 14 or other I/O devices on the control bus 10 to which it could be addressed. This bi-directional passage of data will continue as long as the FETs 102 and 106 are gated "ON" by the multiplex channel address decoder 78. When the multiplex channel address decoder 78 decodes a multiplex channel address other than its programmed multiplex channel address in a data frame, it sends a signal gating the FETs 102 and 106 "OFF". This prevents data from passing in either direction through the data disconnect switch 82.

Figure 5:
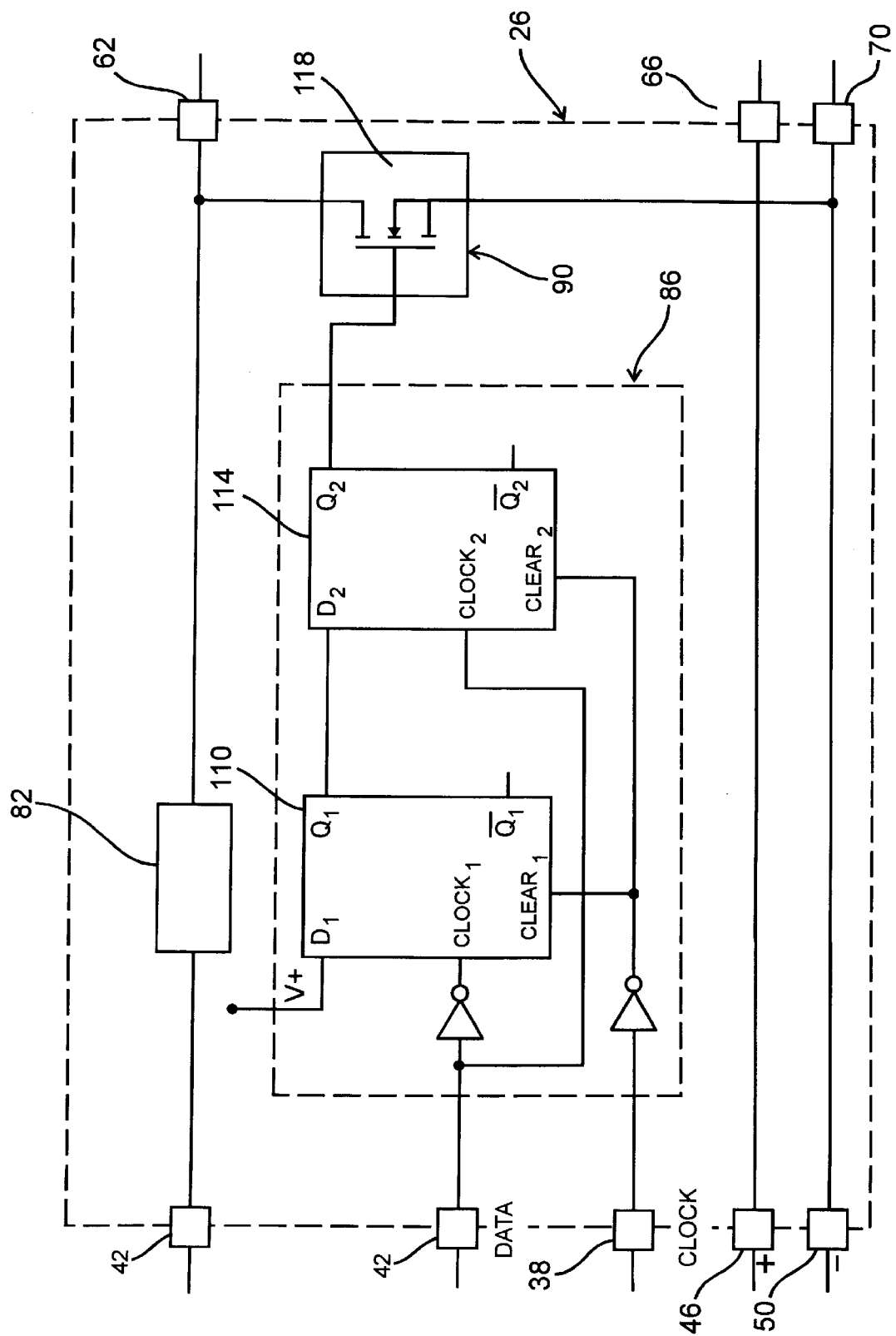
FIG. 5 is a circuit diagram of one embodiment of a heartbeat pass-through/repeater circuit and a branch line controller of a multiplex extender in accordance with the present invention.

FIG. 5 illustrates one embodiment of the heartbeat pass-through/repeater 94 and the branch line controller 90. In this embodiment a first D-latch 110 and a second D-latch 114 are used to pass through or repeat the heartbeat pulse from each data frame to the discrete I/O devices 34, regardless of the multiplex channel address of the data frame. Inputs to the first D-latch 110 include V+voltage at the D input, an inverted input from the data input terminal 42 at the clock terminal and an inverted input from the clock input terminal 38 at the clear terminal. The inputs for the second D-latch 114 include the Q output from the first D-latch 110 at the D input terminal, an input from the data input terminal 42 at the clock terminal, and an inverted input from the clock input terminal 38 at the clear input terminal. The Q output of the second D-latch 114 provides the pass-through or repeat of the heartbeat pulse and is connected to the branch line controller 90. In this embodiment, the control switch 118 of the branch line controller 90 is a FET with its source connected to the negative power line and its drain connected to the data output terminal 62. The gate of the FET 118 receives the control signal from the Q output of the second D-latch 114. As the FET 118 is gated "ON", the branch line 30 is pulled LOW, thus passing through the heartbeat pulse. The branch line controller 90 works in the same manner when controlled by an output signal from the data latch/repeater 86 to repeat a latched data frame.

Figure 6:
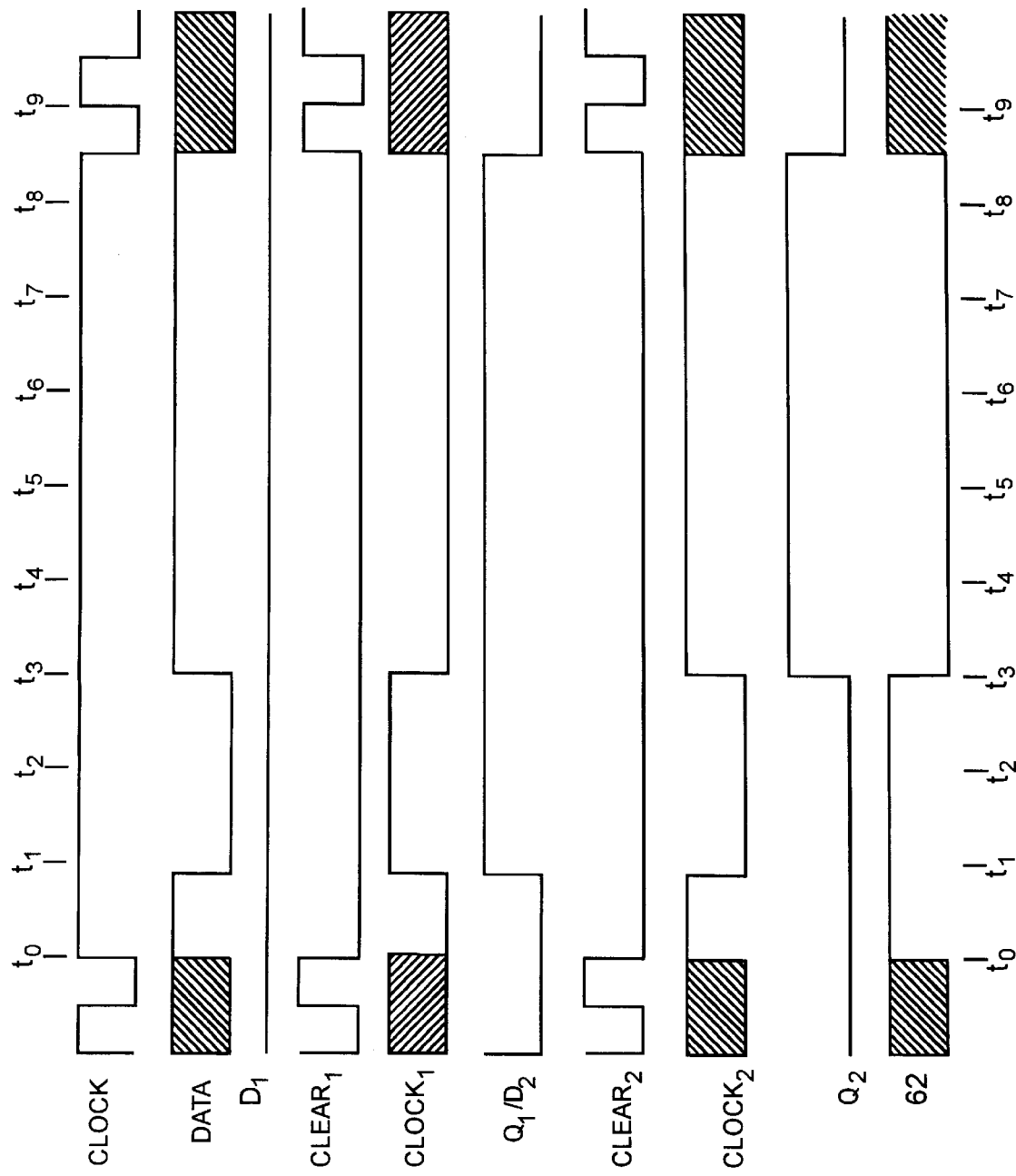
FIG. 6 is a timing diagram of the input and output signals of the heartbeat pass-through/repeat circuit of FIG. 5 in accordance with the present invention.

FIG. 6 illustrates an example timing graph of the input and output wave forms from the heartbeat passthrough/repeater 94. The heartbeat pulse is normally sent during a synchronization period at the beginning of each data frame. In this particular example, the sync period starts at $t_0$ when the bus controller 14 pulls the clock signal HIGH and holds it HIGH for 8.5 cycles($t_{8.5}$). At the beginning of the sync period ($t_0$), the bus controller 14 also pulls the data line HIGH for one clock cycle and then at $t_1$ pulls it LOW for two clock cycles before releasing it to go HIGH for the remainder of the sync period at $t_3$. When the up-line data line goes LOW at the end of the first clock cycle, $t_1$ of the sync period, the Q output ($Q_1$) of the first D-latch 110 goes HIGH. After two more clock cycles ($t_3$) the up-line data line goes HIGH again and the Q output ($Q_2$) of the second D-latch 114 also goes HIGH. At the end of the sync period ($t_{8.5}$) the clock line is driven LOW and thereby resets the Q outputs ($Q_1$ and $Q_2$)of both D-latches 110 and 114 to LOW again. The D input ($D_1$) of the first D-latch 110 is V+ and will remain HIGH throughout the sync period. The D input ($D_2$) of the second D-latch 114 is the same as the Q output ($Q_1$) of the first D-latch 110. The Q output ($Q_2$) of the second D-latch 114 is sent to the branch line controller 90. The actual heartbeat pulse passed to the data output terminal 62 by the branch line controller 90 is the opposite of the Q output ($Q_2$) of the second D-latch 114. The areas of the timing graph shown as diagonal lines indicate periods in which the data line can be either HIGH or LOW.

We claim:

1. A multiplex extender for a time division multiplexed control bus having plurality of multiplex channel addresses, said multiplex extender comprising:

an input terminal for connecting to the time division multiplexed control bus;

an output terminal for connecting to a branch line on which a plurality of discrete I/O devices are attached;

a multiplex channel address decoder in communication with said input terminal;

a data disconnect switch connected in series with said input and said output terminals for selectively passing or blocking data received from the time division multiplexed control bus and data received from the plurality of discrete I/O devices on the branch line;

a branch line controller for transmitting data to the branch line when said data disconnect switch is blocking data from the time division multiplexed control bus; and a data latch/repeater having an input connected to said input terminal and an output connected to said branch line controller, said data latch/repeater selectively latching data received from the time division multiplexed control bus or repeating previously latched data to the plurality of discrete I/O devices on the branch line.

2. The multiplex extender of claim 1 wherein said multiplex channel address decoder is selectively programmable to a particular one of the plurality of multiplex channel addresses of the time division multiplex control bus.

3. The multiplex extender of claim 2 wherein said multiplex channel address decoder produces at least one TRUE output signal in response to decoding said selectively programmed multiplex channel address and at least one FALSE output signal in response to decoding any other of the plurality of multiplex channel address of the time division multiplexed control bus.

4. The multiplex extender of claim 3 wherein said data disconnect switch is a bi-directional switch being selectively closed in response to said at least one TRUE output signal or opened in response to said at least one FALSE output signal of said multiplex channel address decoder circuit.

5. The multiplex extender of claim 3 wherein said data latch/repeater includes a volatile memory storage means for selectively storing data received from the time division multiplexed control bus in response to said at least one TRUE output signal from said multiplex channel address decoder, or repeating previously stored data in response to said at least one FALSE output signal from said multiplex channel decoder.

6. The multiplex extender of claim 3 wherein said multiplex channel address decoder produces a current signal of a particular value for pulling the branch line to one of a HIGH or a LOW state, said current signal being produced only when said multiplex channel address decoder does not decode said selectively programmed multiplex channel address.

7. The multiplex extender of claim 6 wherein said branch line controller includes an output connected to said output terminal, an input connected to either of a positive or a negative power source, dependent upon the HIGH or LOW state of the branch line as determined by said current signal of said multiplex channel address decoder, and a control terminal for selectively operating said branch line controller in response to a control signal from said data latch/repeater, said control signal causing the branch line to be pulled to the opposite of the HIGH or LOW state determined by said current signal of said multiplex channel address decoder for the duration of said control signal.

8. The multiplex extender of claim 7 wherein said multiplex extender further includes a heartbeat passthrough/repeater, having an input connected to said input terminal and an output connected to said control terminal of said branch line controller for selectively pulling the branch line to the opposite of the HIGH or LOW state determined by said current signal of said multiplex channel address decoder for the duration of said heartbeat pulse, said heartbeat pass-through/repeater passing a heartbeat pulse received from the time division multiplexed control bus to the branch line and the discrete I/O devices attached thereto regardless of the multiplex channel address decoded by said multiplex channel address decoder.

9. A multiplex extender for multiplexing discrete I/O devices on a time division multiplexed control bus, said multiplex extender comprising:

a multiplex channel address decoder, selectively programmed to one of a plurality of multiplexed channel addresses available on the time division multiplexed control bus and being connected to a data line of the multiplex control bus such that data frames including the multiplexed channel addresses of the time division multiplexed control bus can be received, said multiplex channel address decoder producing at least one output signal in response to decoding each multiplexed channel address of the time division multiplexed control bus;

a data disconnect switch being connected in series with the data line of the time division multiplexed control bus and a branch data line to which the discrete I/O devices are connected, said data disconnect switch being selectively opened and closed in response to said at least one output signal from said multiplex channel address decoder;

a branch line controller for transmitting data to the branch data line when said data disconnect switch is open; and a data latch/repeater being connected to the data line of the time division multiplexed control bus and having an output connected to said branch line controller, said data latch/repeater selectively latching a data frame received from the time division multiplexed control bus data line or repeating a previously latched data frame to the branch data line and discrete I/O devices connected thereto in response to said at least one output signal from said multiplex channel address decoder.

10. The multiplex extender of claim 9 wherein said multiplex channel address decoder includes a plurality of dip switches selectively positioned to indicate a code representing a particular one of the plurality of multiplexed channel addresses available on the time division multiplexed control.

11. The multiplex extender of claim 9 wherein said multiplex channel address decoder includes an EEPROM which is selectively programmed to a code representing a particular one of the plurality of multiplexed channel addresses available on the time division multiplexed control bus.

12. The multiplex extender of claim 9 wherein said data disconnect switch is a bi-directional switch, said data disconnect switch being selectively closed thereby permitting data from said data frame to pass through said data disconnect switch to the discrete I/O devices and data from the discrete I/O devices to pass through said data disconnect switch to the time division multiplexed control bus only when said at least one output signal from said multiplex channel decoder indicates said selectively programmed multiplex channel address has been decoded by said multiplex channel address decoder.

13. The multiplex extender of claim 9 wherein said data latch/repeater includes a volatile memory device for selectively latching data contained in a data frame associated with said selectively programmed multiplex channel address.

14. The multiplex extender of claim 13 wherein said multiplex channel address decoder sends a signal to said data latch/repeater causing said data latch/repeater to latch data from the data frame only when said selectively programmed multiplex channel address is decoded by said multiplex channel address decoder.

15. The multiplex extender of claim 13 wherein said multiplex channel address decoder sends a signal to said data latch/repeater causing said data latch/repeater to repeat the previously latched data when any other of the plurality of multiplex channel addresses is decoded by said multiplex channel address decoder.

16. The multiplex extender of claim 9 wherein said multiplex extender further includes a heartbeat pass-through/repeater connected in series with the time division multiplexed control bus data line and the branch data line, for passing through only a heartbeat pulse attached to each data frame of the time division multiplexed control bus data to the discrete I/O devices attached to the branch data line, regardless of the multiplexed channel address decoded by said multiplex channel address decoder.

17. A multiplex extender connected intermediate a time division multiplexed control bus and a branch line for extending multiplexing to a plurality of discrete I/O devices connected to the branch line, said extender comprising:
 a multiplex channel address decoder, selectively programmable to a particular one of a plurality of multiplex channel addresses of the time division multiplexed control bus;
 a data disconnect switch, in communication with and controlled by said multiplex channel address decoder such that said data disconnect switch is selectively opened and closed in response to said multiplex channel address decoder decoding said particular multiplex channel address;
 a branch line controller for transmitting data to the branch line when said data disconnect switch is open; and
 a data latch/repeater in communication with and controlled by said multiplex channel decoder such that data from the time division multiplexed control bus is selectively stored in response to said multiplex channel address decoder decoding said particular multiplex channel address or repeated to the discrete I/O devices on the branch line in response to said multiplex channel address decoder decoding any other of the multiplex channel addresses.

18. A multiplex extender connected intermediate a time division multiplexed control bus and a branch line for extending multiplexing to a plurality of discrete I/O devices connected to the branch line, said extender comprising:
 a multiplex channel address decoder, selectively programmable to a particular one of a plurality of multiplex channel addresses of the time division multiplexed control bus;
 a data disconnect switch, in communication with and controlled by said multiplex channel address decoder such that said data disconnect switch is selectively closed in response to said multiplex channel address decoder decoding said particular multiplex channel address and opened in response to said multiplex channel address decoder decoding any other of the multiplex channel address;
 a branch controller for transmitting data to the branch line when said data disconnect switch is open;
 a data latch/repeater in communication with and controlled by said multiplex channel decoder such that data from the time division multiplexed control bus is selectively stored in response to said multiplex channel address decoder decoding said particular multiplex channel address or repeated to the discrete I/O devices on the branch line in response to said multiplex channel address decoder decoding any other of the multiplex channel addresses; and
 a heartbeat pass-through/repeater, for passing through a heartbeat pulse from each data frame of the time division multiplexed control bus to the discrete I/O devices attached to the branch data line, regardless of the multiplex channel to which the data frame is address.

19. A multiplex extender for multiplexing discrete I/O devices on a time division multiplexed control bus, said multiplex extender comprising:
 a multiplex channel address decoder, selectively programmed to one of a plurality of multiplexed channel addresses available on the time division multiplexed control bus and being connected to a data line of the multiplex control bus such that data frames associated with multiplex channel addresses of the time division multiplexed control bus can be received, said address decoder producing an output signal in response to decoding said selectively programmed multiplex channel address;
 a data disconnect switch, connected in series with the data line of the time division multiplexed control bus and a branch data line to which the discrete I/O devices are connected, said data disconnect switch being selectively controlled by one of said at least one output signals from said multiplex channel address decoder;
 a branch line controller, for transmitting data to the branch data line and the discrete I/O devices attached thereto;

a data latch/repeater, connected in series with the data line of the time division multiplexed control bus and said branch line controller, said data latch/repeater being controlled by another of said at least one output signals from said multiplex channel address decoder for selectively latching a data frame addressed to said selectively programmed multiplex channel address of the time division multiplexed control bus or repeating a previously latched data frame to said branch data line and discrete I/O devices connected thereto; and a heartbeat pass-through/repeater, connected in series with the data line of the time division multiplexed control bus and said branch line controller, said heartbeat pass-through/repeater passing a heartbeat pulse from each data frame of the time division multiplexed control bus to said branch data line and discrete I/O devices attached thereto, regardless of the multiplex channel to which the data frame is address.

* * * * *